(12) United States Patent
Kusama et al.

(10) Patent No.: US 7,031,988 B2
(45) Date of Patent: Apr. 18, 2006

(54) METHOD FOR DISPLAYING THE AMOUNT OF STORAGE USE

(75) Inventors: Takato Kusama, Yokohama (JP); Kei Takeda, Kawasaki (JP); Tatsundo Aoshima, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 10/384,254

(22) Filed: Mar. 6, 2003

(65) Prior Publication Data
US 2004/0078376 A1 Apr. 22, 2004

(30) Foreign Application Priority Data
Oct. 21, 2002 (JP) ............................. 2002-305415

(51) Int. Cl.
*G06F 17/30* (2006.01)
(52) U.S. Cl. ................................................. 707/205
(58) Field of Classification Search ................ 707/1, 707/10, 101, 205
See application file for complete search history.

(56) References Cited

U.S. PATENT DOCUMENTS

| | | | | |
|---|---|---|---|---|
| 6,148,335 A * | 11/2000 | Haggard et al. | ............ | 709/224 |
| 6,393,471 B1 * | 5/2002 | Kobata | ............ | 709/221 |
| 6,505,246 B1 * | 1/2003 | Land et al. | ............ | 709/224 |
| 6,606,658 B1 | 8/2003 | Uematsu | | |
| 6,684,229 B1 * | 1/2004 | Luong et al. | ............ | 707/204 |
| 2002/0124137 A1 | 9/2002 | Ulrich et al. | | |
| 2003/0061129 A1 | 3/2003 | Todd et al. | | |
| 2003/0093501 A1 | 5/2003 | Carlson et al. | | |
| 2003/0115073 A1 | 6/2003 | Todd et al. | | |
| 2004/0243945 A1 | 12/2004 | Benhase et al. | | |

OTHER PUBLICATIONS

Roger Jennings "Using Microsoft Windows 2000 Server", published in 2000, pp. 418-424 and 448-449.*
Roger Zimmermann, "Continuous Display Using Heterogeneous Disk-Subsystems", pp. 227-238.*

* cited by examiner

Primary Examiner—Jeffrey Gaffin
Assistant Examiner—Haythim Alaubaidi
(74) Attorney, Agent, or Firm—Townsend and Townsend and Crew LLP (57) ABSTRACT

It is an object of the present invention to display the amount of storage subsystem use by a specified computer or file system in accordance with the information acquired from computers and storage subsystems. An information collection engine provided for each computer acquires file system configurations from computers and volume configurations from storage subsystems. Further, a special computer is provided with a polling engine that gathers the data acquired by each information collection engine and stores it in an internal database, and with a data display engine that acquires the information about the amount of storage subsystem use by a specified computer or file system from said internal database and displays it on screen.

3 Claims, 9 Drawing Sheets

COLLECTION RESULT STORAGE AREA (0122)

0151 — COMPUTER SETUP INFORMATION TABLE

| COMPUTER NAME (0311) | FILE SYSTEM NAME (0312) | TOTAL CAPACITY (0313) | AMOUNT OF USE (0314) | STORAGE SUBSYSTEM (0315) | LU (0316) |
|---|---|---|---|---|---|
| Server A | /home | 75GB | 30GB | Hitachi_9900V (35012) | 10 |
| Server A | /etc | 20GB | 5GB | Hitachi_9900V (35012) | 21 |
| Server A | ... | ... | ... | ... | ... |

0152 — STORAGE INFORMATION TABLE

| STORAGE SUBSYSTEM (0321) | LU (0322) | CAPACITY (0323) | RAID LEVEL (0324) | RAID CONFIGURATION DISK COUNT (0325) | PARITY DISK COUNT (0326) |
|---|---|---|---|---|---|
| Hitachi_9900V (35012) | 10 | 100GB | 5 | 4 | 1 |
| Hitachi_9900V (35012) | 11 | 75GB | 0 | 2 | 0 |
| Hitachi_9900V (35012) | ... | ... | ... | ... | ... |

0153 — COPY INFORMATION TABLE

| STORAGE SUBSYSTEM (0331) | LU (0332) | COPY DESTINATION STORAGE SUBSYSTEM (0333) | COPY DESTINATION LU (0334) |
|---|---|---|---|
| Hitachi_9900V (35012) | 10 | Hitachi_9900V (35012) | 11 |
| Hitachi_9900V (35012) | 12 | Hitachi_9900V (35013) | 05 |
| Hitachi_9900V (35012) | ... | ... | ... |

0154 — TAPE LIBRARY INFORMATION TABLE

| TAPE LIBRARY NAME (0341) | COPY SOURCE STORAGE SUBSYSTEM (0342) | COPY SOURCE LU (0343) |
|---|---|---|
| TapeLibrary A | Hitachi_9900V (35013) | 01 |
| TapeLibrary A | Hitachi_9900V (35013) | 02 |
|  | ... | ... |

METHOD FOR DISPLAYING THE AMOUNT OF STORAGE USE

BACKGROUND OF THE INVENTION

The present invention relates to a technology for managing the information concerning the volumes of a storage subsystem that is used by a computer or file system in a network environment where one or more servers (computers) and storage controllers (storage subsystems) exist, and more particularly to a technology for displaying actual volume usage by a specified computer or file system.

In recent years, the SAN (Storage Area Network) technology has attracted a good deal of attention as it reduces the storage management cost. In the SAN environment, a plurality of servers (computers) use a storage controller (storage subsystem), which is a dedicated storage device. More specifically, the volumes within a storage subsystem are assigned to the computers for their use.

Under these circumstances, the amount of storage use by corporations has increased year after year. It is therefore important that computer/storage subsystem capacity management be properly exercised. In a conventional computer capacity management, file system capacity deletion is prevented by monitoring the amount of file system use within a computer and the change in the available free space. As a method for acquiring the capacity information about individual computers, a technology for monitoring the capacity and performance of a plurality of computers is disclosed by U.S. Pat. No. 6,148,335.

In conventional storage subsystem capacity management, the unallocated storage space within a storage subsystem is monitored, for instance, to time the addition of a disk to the storage subsystem. Tools and other items for displaying the storage subsystem capacity information are commercialized by storage subsystem vendors and the like.

The above-described conventional methods are for monitoring either the computer side or storage subsystem side. In some cases, these methods are inadequate for determining the amount of actual use by a specific file system. In reality, various methods are used, depending on the data importance, to create redundant data as the data to be stored in a storage subsystem.

If, for instance, RAID (Redundant Arrays of Independent Disks) 1, RAID 5, or other similar parity data disks are used, a snapshot or mirror copy is created within a storage subsystem, or a backup is made in a remote storage subsystem or tape library, the amount of storage allocated to computers differs from the amount of storage used within the storage subsystem. In this instance, the conventional method for monitoring either the computer side or storage subsystem side cannot determine the amount of actual use by a specific file system.

When the above conventional method is used to determine the amount of actual use by a specific file system, the RAID structure, mirroring, remote copy, and other relevant configurations need to be acquired from individual computers and storage subsystem and then manually associated with each other by a storage administrator. These steps are troublesome to the storage administrator. Further, the steps to be performed for estimating the storage capacity required for file system capacity expansion in the above-mentioned structure are extremely complicated.

SUMMARY OF THE INVENTION

It is an object of the present invention to determine and display the amount of actual storage subsystem use by a specified computer or file system in accordance with the information acquired from computers and storage subsystems.

To accomplish the above object in a system where computers and storage subsystems are network-connected, the present invention places an information collection engine in each computer to gather necessary information from the computers and storage subsystems. The information collection engine acquires the capacity information and connection destination storage subsystem information about each file system from the computers and the internal configurations of storage subsystems from connection destination storage subsystems. Further, the present invention places a polling engine and a data display engine on a special computer. The polling engine gathers the data collected by the information collection engine for each computer and store it in an internal database. The data display engine displays the information that is stored in the internal database and related to a specified computer or file system. The data display engine acquires the information about a specified computer or file system from the internal database, and displays a list of storage subsystems used by the computers and file systems as well as the sizes of storage subsystem volumes and the amounts of their use.

The data display engine displays the storage subsystems used by a specified computer or file system and the interdependence among storage subsystem internal volumes. Further, the data display engine displays a list of storage subsystem volumes used by a specified computer or file system as well as the size of each volume and the amount of its use.

When the capacity of a specified file system prevailing after its expansion is entered into a special computer, the present invention displays the disk capacity that is required for each storage subsystem within the current configuration when the file system capacity changes to the value entered above.

The special computer predicts the future capacity in accordance with the capacity increase/decrease of a specified file system within a specified period. When the file system capacity is to be changed to the above predicted value, the special computer displays the disk capacity required for each storage subsystem within the current configuration.

The special computer references a predefined price table to display the cost of disk purchase required for file system expansion.

DESCRIPTION OF THE PREFERRED EMBODIMENT

One preferred embodiment of the present invention will now be described in detail with reference to the drawings. The functions and other details irrelevant to the description of the present invention are excluded from the following examples of a storage information display system according to a preferred embodiment. Therefore, the storage information display system described below is simpler than a common storage information display system. However, the following description is a preferred example of implementing the invention, and is not necessarily intended to limit the scope of the present invention.

Figure 1:
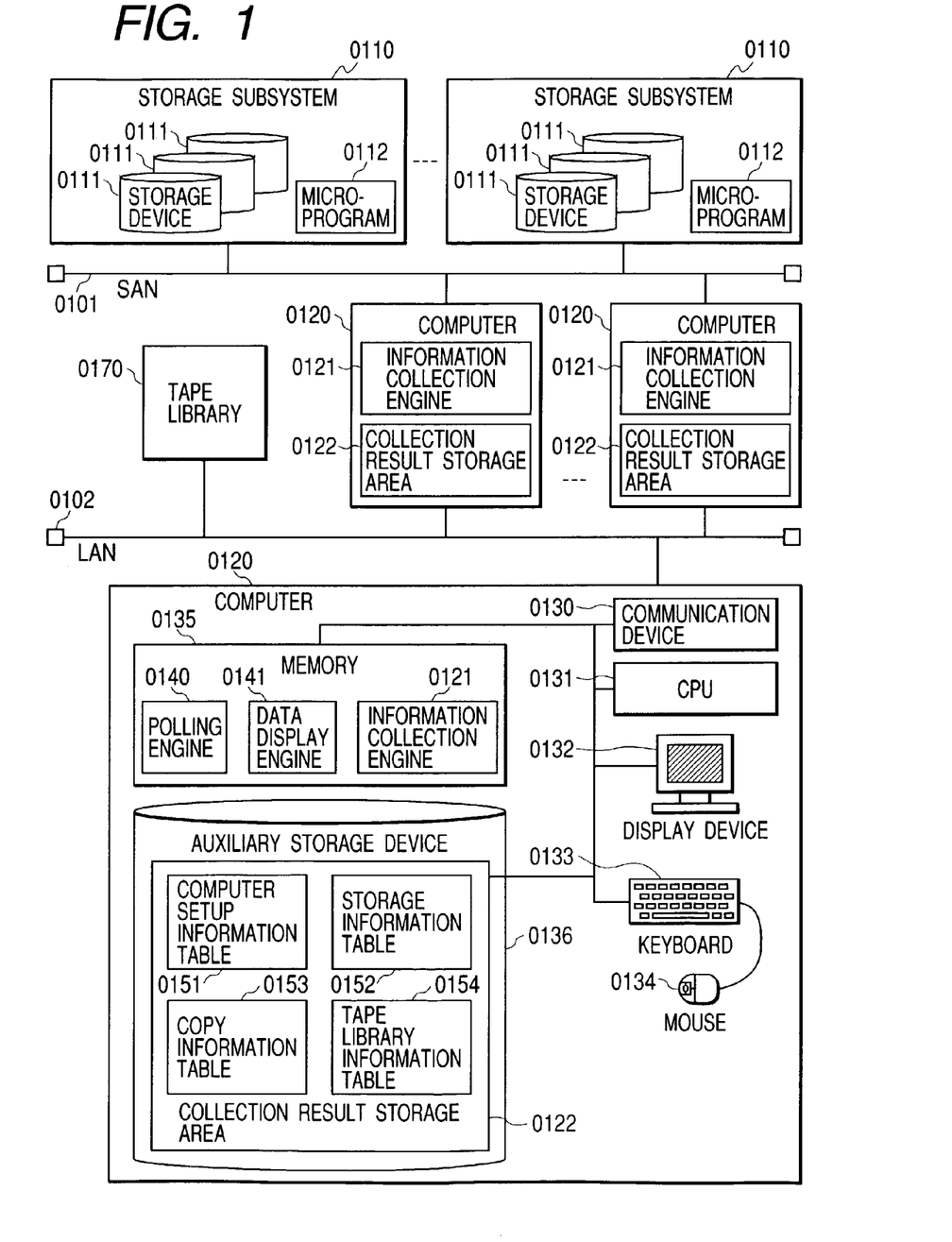
FIG. 1 shows the configuration of a system that implements a method for displaying the amount of storage use according to the present invention.

FIG. 1 shows the system configuration according the embodiment. The system includes a plurality of storage controllers (storage subsystems) 0110, a plurality of servers (computers) 0120, a plurality of tape libraries 0170, a LAN (Local Area Network) 0102 for connecting the computers 0120 and tape libraries 0170, and a SAN (Storage Area Network) 0101 for connecting the storage subsystems 0110 and computers 0120.

The storage subsystem 0110 is a device that includes a plurality of storage devices 0111 and a microprogram 0112. The microprogram 0112 is capable of organizing a plurality of storage devices 0111 by allocating volumes having a specified RAID level and size among them. The microprogram 0112 is also capable of releasing the above volumes to the computers 0120, periodically copying a specific volume to another volume within the local storage subsystem or a volume within a remote storage subsystem, and sending a list of volumes in the local storage subsystem 0110 and the configuration of each volume to the computers 0120 via the LAN (not shown).

In the subsequent description, the volumes within a storage subsystem are referred to as LUs (Logical Units). A parity data storage area appropriate for the employed RAID level exists on each LU. The size of the data area excluding the parity data storage area is herein referred to as the LU capacity. The area including the data area and parity data storage area is referred to as the LU configuration size.

The computers 0120 of the embodiment comprise a communication device 0130, a CPU 0131, a display device 0132, a keyboard 0133, a mouse 0134, a memory 0135, and an auxiliary storage device 0136. Each computer 0120 executes an information collection engine 0121. Further, a special computer 0120 executes a polling engine 0140 and a data display engine 0141. Both of these engines are stored as program data on an LU assigned to the computer 0120 or on the auxiliary storage device 0136. When these engines need to be executed, they are both loaded into the memory 0135 and then executed by the CPU 0131. In some SAN environments, a backup program or copy program may be executed within the computer 0120. The backup program periodically copies a specific LU within a storage subsystem 0110 to another LU or a tape library 0170.

The information collection engine 0121 is a program for periodically acquiring the information about the computers 0120, storage subsystems 0110, and tape libraries 0170, and storing it in a collection result storage area 0122. The polling engine 0140 is a program for periodically acquiring the data stored in the collection result storage area 0122 from each computer 0120 and storing it in the collection result storage area 0122 within the computer 0120 that executes the engine. The data display engine 0141 displays the information about a specified computer, file system, or storage subsystem in accordance with the information stored in the collection result storage area 0122. The process performed by each engine will be detailed later.

Figure 2:
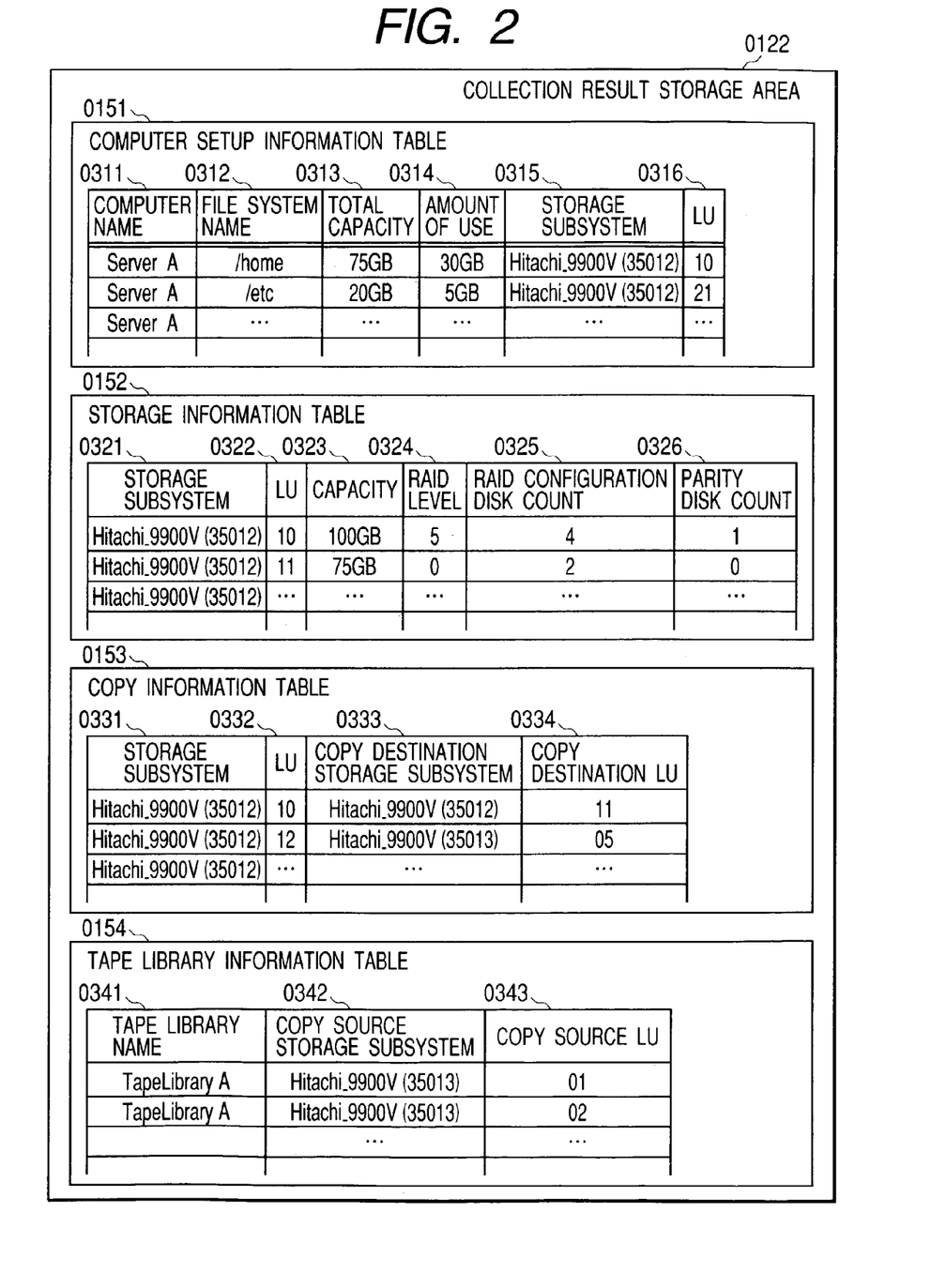
FIG. 2 shows the structures of tables within a collection result storage area according to a preferred embodiment of the present invention.

FIG. 2 shows an example of the collection result storage area 0122 of the embodiment. The collection result storage area 0122 comprises a computer set up information table (hereinafter called a computer configuration table) 0151, a storage information table 0152, a copy information table 0153, and a tape library information table 0154. The records within the tables are created by the information collection engine 0121 to register values in appropriate columns.

The records in the computer configuration table 0151 shows the relationship between file systems and LUs assigned to the file systems. If a file system uses two or more LUs, a plurality of records are stored per file system. The column for "Computer name" 0311 indicates the name of a computer to which a file system belongs. The column for "File system name" 0312 indicates the name of a file system. The column for "Total capacity" 0313 indicates the capacity of a file system. The column for "Amount of use" 0314 indicates the actual amount of use by a file system. The column for "Storage subsystem" 0315 indicates the name of a storage subsystem to which a file system is connected. The column for "LU" 0316 indicates the name of an LU that is located in a storage subsystem 0315 and used by a file system.

The records in the storage information table 0152 contain the configurations relating to the LUs within a storage subsystem. The column for "Storage subsystem" 0321 indicates the name of a storage subsystem in which the LU represented by the record exists. The column for "LU" 0322 indicates the name of the LU that is represented by the record. The column for "Capacity" 0323 indicates the LU configuration size. The column for "RAID level" 0324 indicates a RAID level of an LU. The column for "RAID configuration disk count" 0325 indicates the number of disks used for the RAID configuration indicated by the column for "RAID level" 0324. The column for "Parity disk count" 0326 indicates the number of disks that are used for parity data storage within a RAID configuration. If, for instance, four disks are used to form a RAID 5 configuration, the column for "RAID level" 0324 reads 5, the column for "RAID configuration disk count" 0325 reads 4, and the column for "Parity disk count" 0326 reads 1.

The records in the copy information table 0153 contain the inter-LU copy configurations. The configurations apply no matter whether the copies are made via the computers or not via the computers. The method of the copies that are made not via the computers is called as serverless backup. The column for "Storage subsystem" 0331 indicates the copy source storage subsystem. The column for "LU" 0332 indicates the copy source LU within the storage subsystem 0331. The column for "Copy destination storage subsystem" 0333 indicates the name of a storage subsystem to which the LU indicated in the column for "LU" 0332 is to be copied. The column for "Copy destination LU" 0334 indicates the LU to which the LU indicated in the column for "LU" 0332 is to be copied.

The records in the tape library information table 0154 contain configurations relating to copy operations to be performed between storage subsystems and tape libraries. The column for "Tape library name" 0341 indicates the name of a tape library to which an LU is to be copied. The column for "Copy source storage subsystem" 0342 indicates the name of a storage subsystem that is handled as a copy source. The column for "Copy source LU" 0343 indicates the LU that is handled as a copy source. The operations performed by the engines will now be described in detail.

(1) Information Collection Engine 0121

Figure 3:
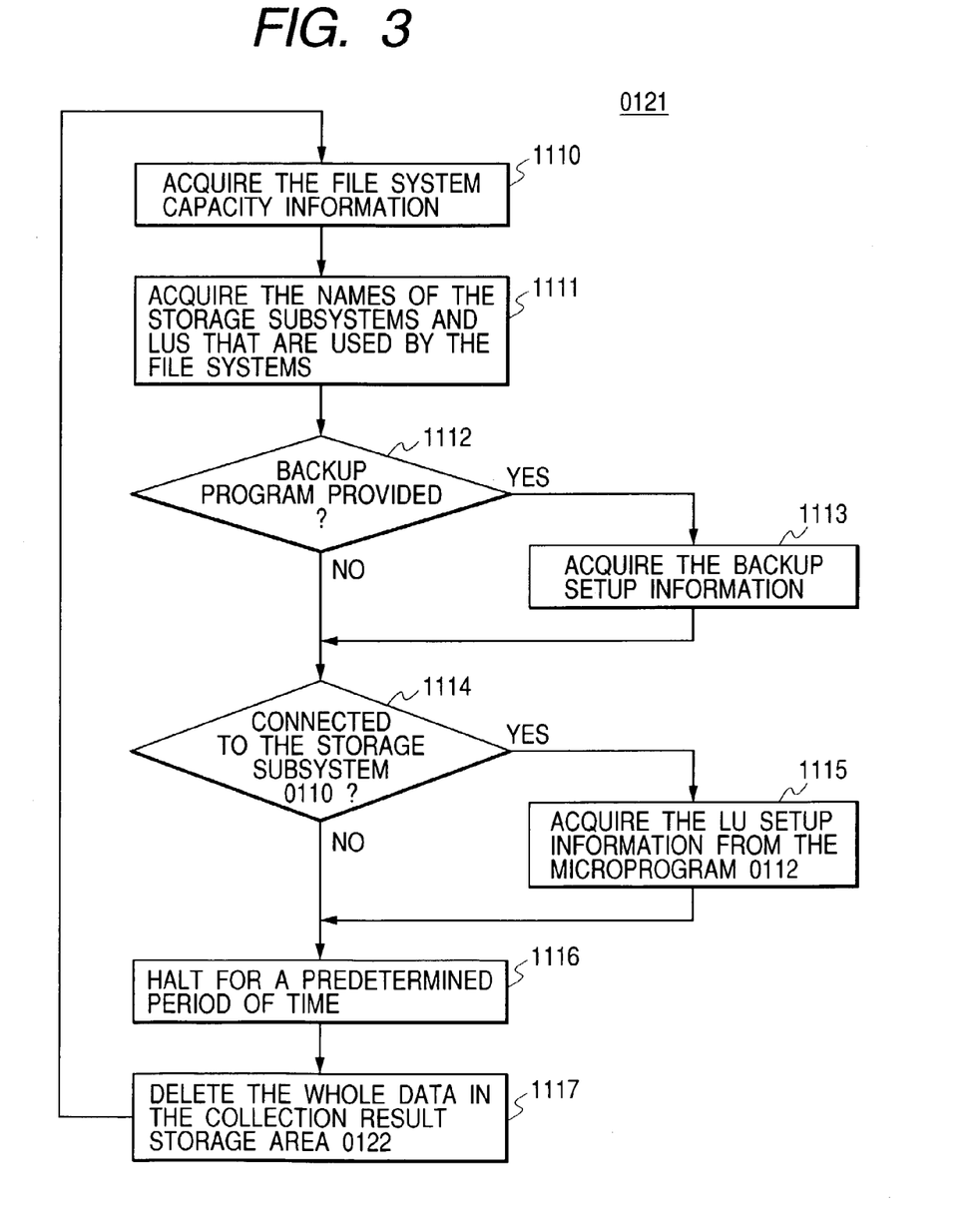
FIG. 3 is a flowchart illustrating the procedures to be performed by an information collection engine according to the embodiment of the present invention.

FIG. 3 is a flowchart that illustrates the operations performed by the information collection engine 0121. In step 1110, the information collection engine 0121 acquires a list of computer names and file systems, and then acquires the information about the total capacities of the file systems and the amounts of actual use by them. These items of information can be obtained by using a system call, command, or tool offered by an operation system.

In step 1111, the information collection engine 0121 acquires the information about the storage subsystems and LUs that are used by the file systems. These items of information can be obtained by using a system call, command, or tool offered by an operation system or a SCSI Inquiry command. The information collection engine 0121 then stores the above items of information, which are acquired in steps 1110 and 1111, in the associated columns of the computer configuration table 0151.

In step 1112, the information collection engine 0121 checks whether a backup program exists in the computers. When a backup program exists, the program flow proceeds to step 1113. If no backup program exists, the program flow proceeds to step 1114. The existence of a backup program can be confirmed by, for instance, letting the storage administrator give a startup parameter to the information collection engine 0121 for the purpose of indicating whether a backup program exists.

In step 1113, the information collection engine 0121 acquires backup set up information (hereinafter called backup configurations) from a backup program. The backup configurations can be set when the information collection engine 0121 references a setup file that is prepared by the user to define the relationship between the copy source and destination in CSV or other predetermined format. As an alternative to the above method, the backup configurations can also be acquired via an API offered by a backup program or by analyzing the log of a backup program.

The information collection engine 0121 performs the process described below in accordance with the acquired backup configurations. When the intra-LU copy configurations are acquired, the information collection engine 0121 stores the name of the copy source storage subsystem, the name of the copy source LU, the name of the copy destination storage subsystem, and the name of the copy destination LU in the associated columns of the copy information table 0153. When the configuration relating to the copy operation to be performed in relation to a tape library, the information collection engine 0121 stores the name of the copy source storage subsystem, the name of the copy source LU, the name of the copy destination tape library in the associated columns of the tape library information table 0154.

In step 1114, the information collection engine 0121 checks the result obtained in step 1111 to determine whether the computer 0120 executing the information collection engine 0121 is connected to the storage subsystem 0110. If such a connection is established, the program flow proceeds to step 1115. If such a connection is not established, the program flow proceeds to step 1116. In step 1115, the information collection engine 0121 acquires the information about the LU configuration size, RAID level, RAID configuration disk count, and parity disk count via the microprogram 0112 in the storage subsystem 0110, and stores the acquired items of information in the associated columns of the storage information table 0152.

Although the embodiment acquires the information about the LU configuration size directly from a microprogram 0112, the information about the LU capacity may alternatively be acquired from the microprogram 0112 to calculate the LU configuration size. More specifically, the LU configuration size can be calculated by subtracting the parity disk count from the RAID configuration disk count, dividing the LU capacity value by the value derived from the subtraction, and multiplying the obtained result by the RAID configuration disk count. In step 1116, the information collection engine 0121 halts for a predetermined period of time. In step 1117, the information collection engine 0121 creates the tables, waits for a predetermined period of time, and then deletes the whole data within the collection result storage area 0122. Next, the information collection engine 0121 proceeds to step 1110 to start creating new tables.

(2) Polling Engine 0140

Figure 4:
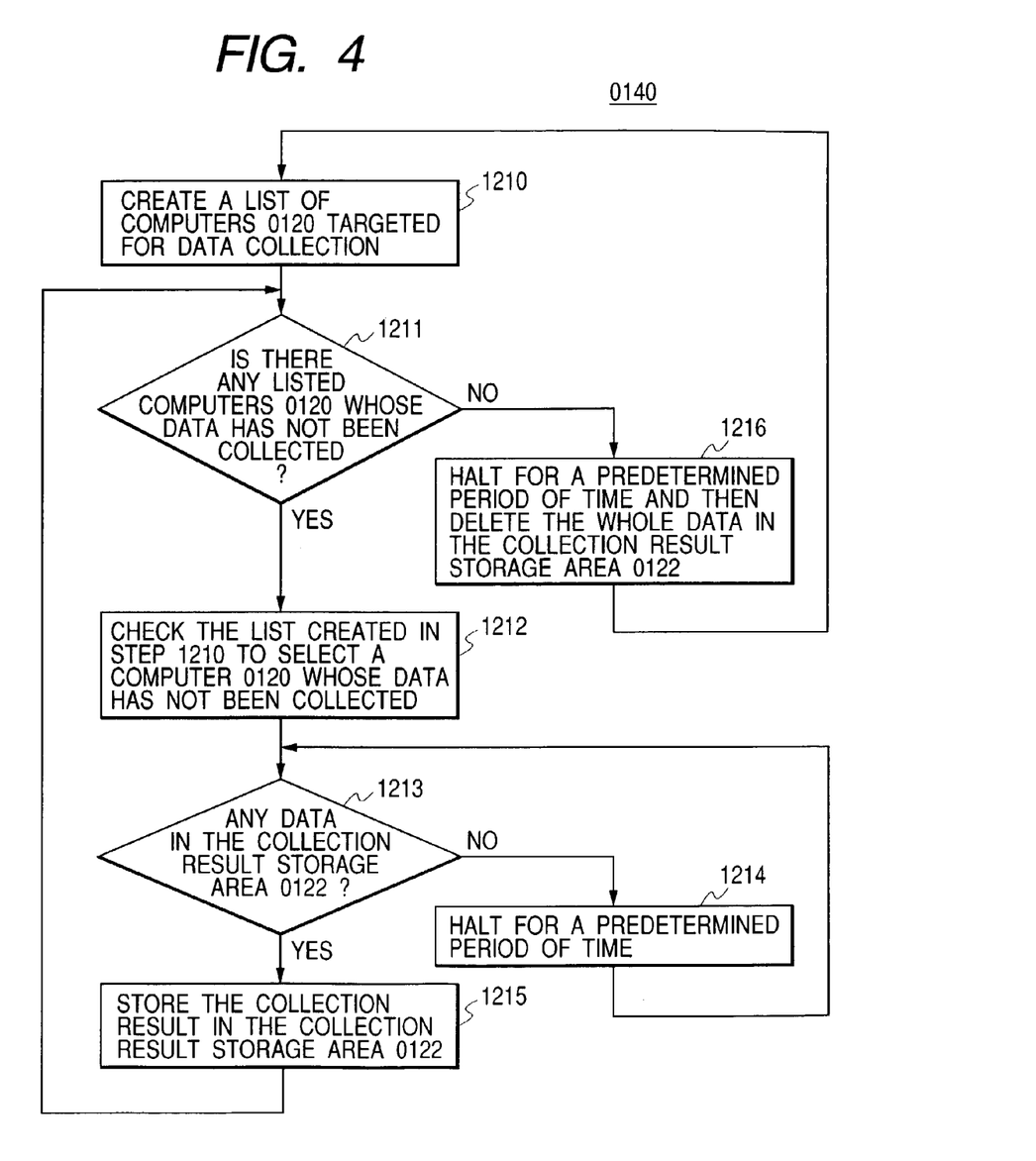
FIG. 4 is a flowchart illustrating the procedures to be performed by a polling engine according to the embodiment of the present invention.

The operation of the polling engine 0140 will now be described. FIG. 4 is a flowchart that illustrates the operation of the polling engine 0140. In step 1210, the polling engine 0140 creates a list of computers 0120 whose data is to be collected. This list creation can be accomplished by, for instance, creating a setup file on the computer 0120 that executes the engine. In step 1211, the polling engine 0140 checks whether the above list includes computers 0120 whose data has not been collected. The program flow proceeds to step 1212 if such a computer is listed. If no such computer is listed, the program flow proceeds to step 1216.

In step 1212, the polling engine 0140 checks the above list and selects a computer 0120 whose data has not been collected. In step 1213, the polling engine 0140 checks whether data exists in the collection result storage area 0122 within the computer 0120. If such data exists, the program flow proceeds to step 1215. If no such data exists, the program flow proceeds to step 1214. In step 1214, the polling engine 0140 halts its process for a predetermined period of time and then proceeds to step 1213. In step 1215, the polling engine 0140 acquires the whole data from the collection result storage area 0122 and stores it in the collection result storage area 0122 in the computer that is currently executing the polling engine 0140.

In step 1216, the polling engine 0140 halts its process for a predetermined period of time and then deletes the whole data from the collection result storage area 0122 in the computer 0120 that executes the polling engine 0140. Subsequently, the polling engine 0140 proceeds to step 1210 to start collecting new data.

(3) Data Display Engine

The operation of the data display engine 0141 will now be described. The data display engine 0141 outputs the information about the special computer, file systems, storage subsystems, and LUs to the display device 0132 from the collection result storage area 0122 in the computer 0120 that executes the engine. The screen showing the result of output may be displayed on the display device 0132 of the computer or displayed on the display device 0132 of another computer 0120 via the LAN 0102.

Figure 5:
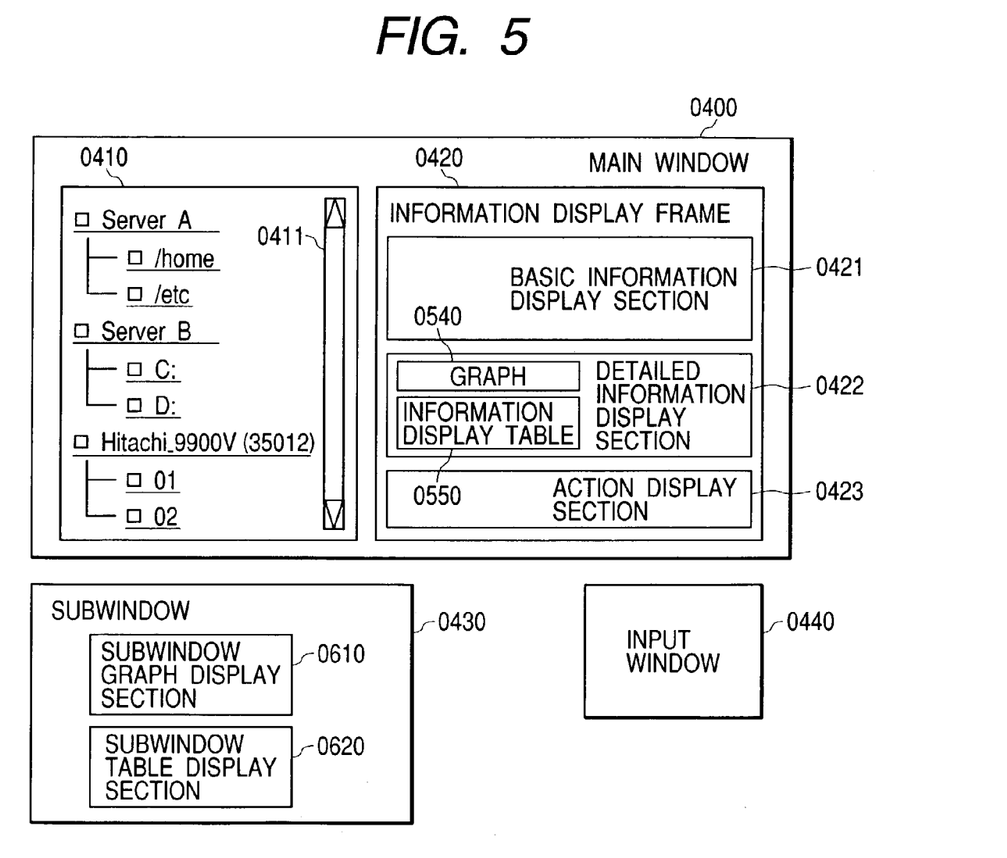
FIG. 5 shows an example of the contents of a resource display frame and information display frame according to the embodiment of the present invention.

FIG. 5 shows an output example of the embodiment. The data display engine 0141 outputs a main window 0400 and, if necessary, a subwindow 0430 and an input window 0440 as well. The main window 0400 comprises a resource display frame 0410 and an information display frame 0420. The resource display frame 0410 lists the computers, file systems, storage subsystems, and LUs on the SAN 0101 and LAN 0102 as resources. Subsequently, the computers, file systems, storage subsystems, LUs, and tape libraries are generically referred to as resources.

When the storage administrator or user selects a computer, file system, storage subsystem, or LU from the resource display frame 0410, the data display engine 0141 displays the information about the selected resource within the information display frame 0420. The information display frame 0420 comprises a basic information display section 0421, a detailed information display section 0422, and an action display section 0423.

The basic information display section 0421 lists the computers, file systems, storage subsystems, LUs, and tape libraries related to a resource that is selected from the resource display frame 0410 by the storage administrator. The detailed information display section 0422 displays the capacity information about the computers, storage subsystems, and tape libraries that are displayed in the basic information display section 0421. The action display section 0423 has a button for displaying additional information. When the storage administrator or user clicks the button, the data display engine 0141 opens the subwindow 0430 or input window 0440. If the information to be displayed is too large to fit on the screen, the data display engine 0141 displays a scrollbar 0411. The user can manipulate the scrollbar to display the information that is currently hidden from view.

The resource display frame 0410 will now be described in detail. The data display engine 0141 displays the resource display frame 0410 in a sequence described below. The data display engine 0141 acquires a list of computers and file systems in the computers by obtaining computer names 0311 and file system names 0312 from the computer configuration table 0151 shown in FIG. 2, and then displays the list within the resource display frame 0410.

Next, a list of storage subsystems and the LUs within the subsystems is obtained by acquiring storage subsystems 0321 and LUs 0322 from the storage information table 0152, and displayed within the resource display frame 0410. For the resources displayed within the resource display frame, the data display engine 0141 also displays hyperlinks and buttons for displaying the information about the resources within the information display frame 0420.

Figure 6:
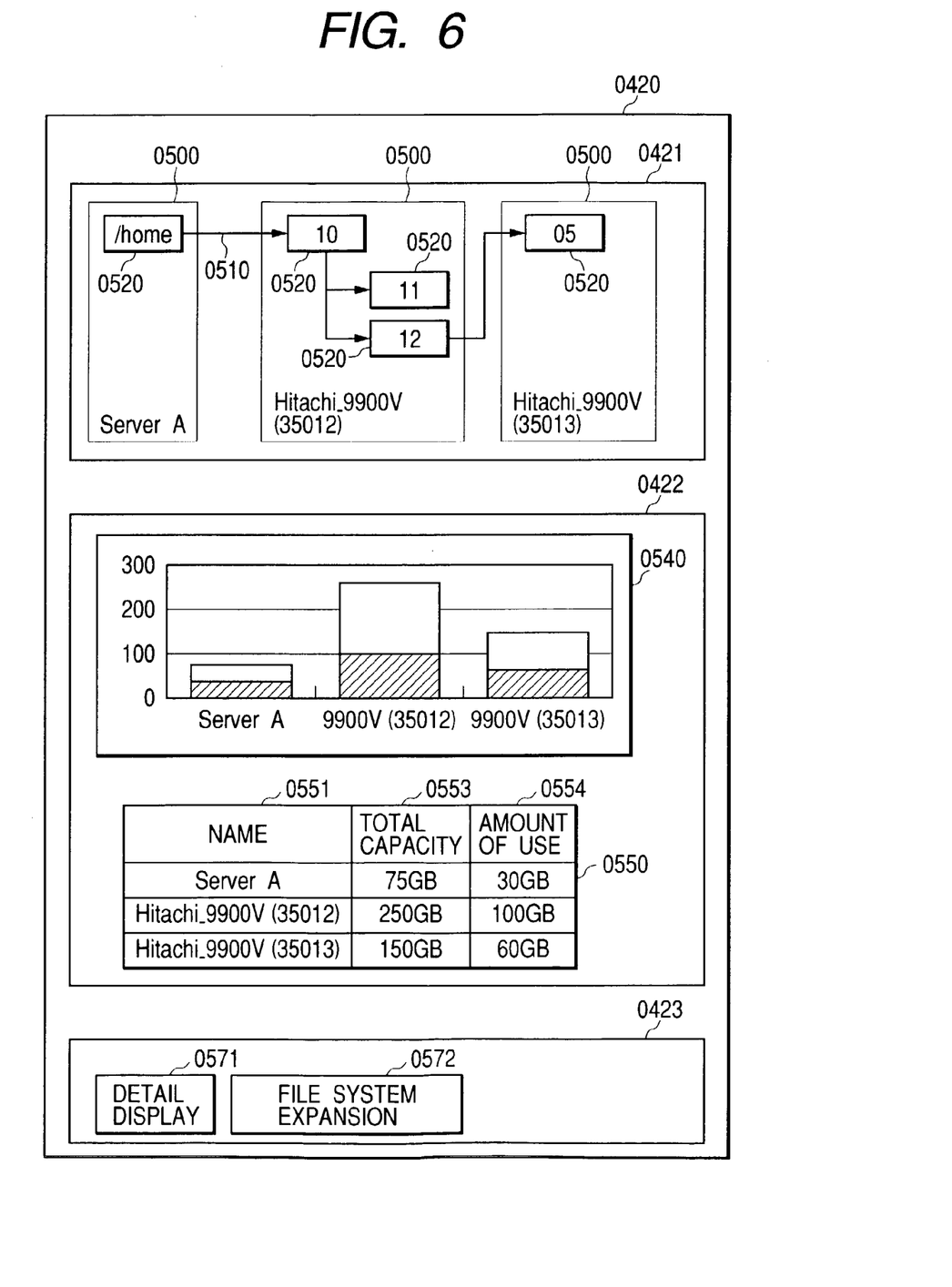
FIG. 6 shows an example illustrating the details of an information display frame according to the embodiment of the present invention.

The information display frame 0420 will now be described in detail. FIG. 6 shows an example of the information display frame 0420. The basic information display section 0421 comprises main boxes 0500, subboxes 0520, and arrows 0510. The main boxes 0500 are figures representing a computer, storage subsystem, or tape library. The resource name is indicated within each main box. The subboxes 0520 are figures representing a file system or LU. The resource name is indicated within each subbox. The subboxes 0520 appear within a main box 0500 to which the associated resources belong. The arrows 0510 serve as a symbol for indicating the LUs connected to a file system or the relationship between an LU copy source and destination, and are used to interconnect the subboxes 0520 or main boxes 0500.

Figure 7:
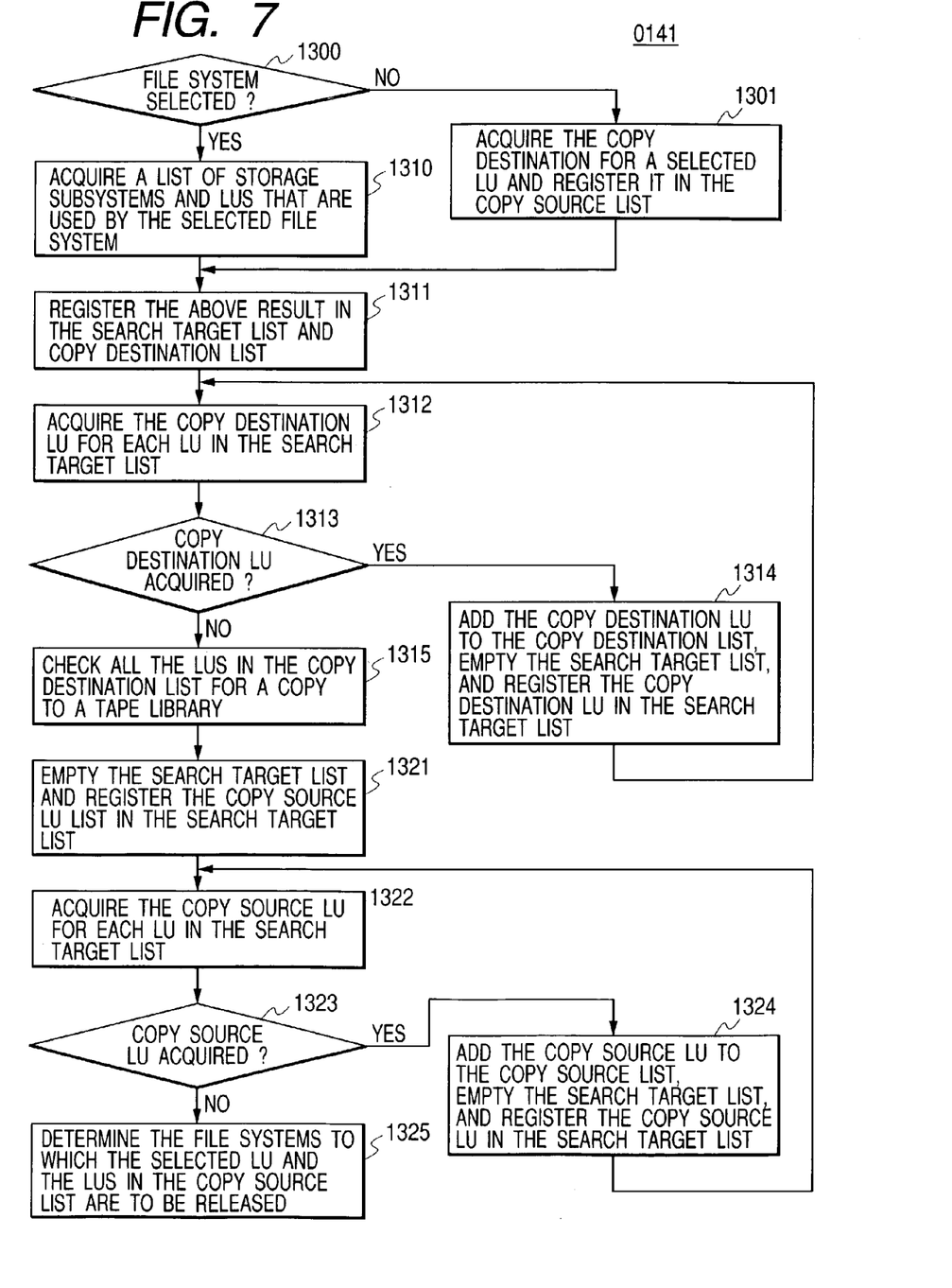
FIG. 7 is a flowchart illustrating the processing steps to be performed by a data display engine according to the embodiment of the present invention.

At first, the method that the data display engine 0141 uses to display the basic information display section 0421 will be described. The data display engine 0141 acquires the information about a copy source resource and copy designation resource that are selected from the resource display frame 0410, and displays the basic information display section 0421 in accordance with the acquired information. FIG. 7 shows the steps for acquiring the information about a copy source resource and copy designation resource that are selected from the resource display frame 0410. The sequence to be followed when a file system or LU is selected from the resource display frame 0410 will be described herein. The display operation for cases where a computer or storage subsystem is selected can be completed by repeating the following sequence for all the file systems and LUs included in the computer or storage subsystem.

Step 1300 shown in FIG. 7 is performed to check whether a file system is selected from the resource display frame 0410. If a file system is selected, the program flow proceeds to step 1310. If an LU is selected, on the other hand, the program flow proceeds to step 1301. In step 1301, the copy destination LU for the LU selected in the resource display frame 0410 is acquired and registered in a copy source list. The copy source LU can be acquired when the copy destination storage subsystem 0333 and copy destination LU 0334 are used as search keys to search the copy information table 0153 for the associated storage subsystem 0331 and LU 0332.

In step 1310, a file system name 0312 is used as a search key to search the computer configuration table 0151 and obtain a list of storage subsystems and LUs that are used by a file system selected in the resource display frame 0410. In step 1311, the list of the copy destination storage subsystems and LUs, which is derived from processing step 1310, is stored in a search target list and copy destination list.

In step 1312, a storage subsystem 0331 and LU 0332 are used as search keys to search the copy information table 0153 and retrieve a copy destination storage subsystem 0333 and copy destination LU 0334 for all the LUs included in the search target list. Step 1313 is performed to check whether the copy destination LU is acquired in step 1312. If the copy destination LU is acquired, the program flow proceeds to step 1314. If the copy destination LU is not acquired, the program flow proceeds to step 1315. Step 1314 is performed to empty the search target list at first and then add the copy destination LU, which is acquired in step 1312 above, to the copy destination list and search target list.

In step 1315, a copy source storage subsystem 0342 and copy source LU 0343 are used as search keys to search the tape library information table 0154 and retrieve a tape library name 0341 for all the LUs included in the copy destination list.

The above steps are followed to perform a process for acquiring the LUs connected to a file system and the LU copy destination. The process for acquiring the copy source LU and connected file system from the copy destination LU will now be described.

Step 1321 is performed to empty the search target list and register the copy source LU list in the search target list. In step 1322, the copy source LU is acquired for all the LUs in the search target list. The copy source LU can be acquired when a copy destination storage subsystem 0333 and copy destination LU 0334 are used as search keys to search the copy information table 0153 and retrieve a storage subsystem 0331 and LU 0332 for all the LUs included in the search target list.

Step 1323 is performed to check whether the copy source LU is acquired in step 1322 above. If the copy source LU is acquired, the program flow proceeds to step 1324. If the copy source LU is not acquired, the program flow proceeds to step 1325. Step 1324 is performed to empty the search target list at first and then add the copy source LU, which is acquired in step 1322 above, to the copy source list and search target list. In step 1325, the file system to which the LUs are to be released is acquired by using a storage subsystem 0315 and LU 0316 as search keys to search the computer configuration table 0151 and retrieving a computer name 0311 and file system name 0312 for the LUs in the copy source list and the LU selected in the resource display frame 0410.

The data display engine 0141 uses the processing result shown in FIG. 7 to display the basic information display section 0421 shown in FIG. 6 in the sequence described below. First, the data display engine 0141 displays a computer 0120, a storage subsystem 0121, and a tape library 0170, which are obtained as the above processing result, as main boxes 0500, and indicates their names within the main boxes 0500. Next, the data display engine 0141 displays file systems and LUs, which are included in the above processing result, as subboxes 0520 within appropriate main boxes 0500, and indicates their names within the subboxes 0520.

The data display engine 0141 then displays arrows 0510 to link a file system and the LUs connected to the file system. The arrows indicate a link between an LU copy source and copy destination. As described with reference to steps 1310, 1325, 1312, and 1322 in FIG. 7, the information about the relationship between an LU copy source and copy destination can be acquired from the computer configuration table 0151, copy information table 0153, and tape library information table 0154.

If a file system selected from the resource display frame 0410 belongs to a disk group that comprises a plurality of LUs, the other file systems belonging to the disk group can be displayed. More specifically, the other file systems belonging to the disk group can be displayed by registering a connection destination LU acquired in step 1310 to the copy source list in step 1325. As a result, the basic information display section 0421 presents a list of file systems that use the LUs.

When the configuration described above is employed, the data display engine 0141 can graphically display the interdependence among the computers, file systems, storage subsystems, and LUs in accordance with the copy configuration derived from each information collection engine 0121. Further, the user can grasp the copy-related interdependence among the above resources without having to launch a plurality of tools and manually associate the output results of the tools with each other.

The method that the data display engine 0141 uses to display the detailed information display section 0422 shown in FIG. 6 will now be described. The detailed information display section 0422 comprises a graph 0540 and an information display table 0550. The graph 0540 is displayed to promote understanding of the contents of the information display table 0550. For example, the individual records of the information display table 0550 can be displayed with a bar graph. Although the embodiment displays a bar graph, the graph to be displayed may be changed according to a user selection.

The data display engine 0141 changes the contents to be displayed by the detailed information display section 0422 depending on whether a computer or file system is selected from the resource display frame 0410 or a storage subsystem or LU is selected from the resource display frame 0410. At first, cases where a computer or file system is selected from the resource display frame 0410 will be described.

The data display engine 0141 causes the detailed information display section 0422 to display the amount of storage use by a computer or file system. The information display table 0550 uses the column for "Name" 0551 to display a computer name or storage subsystem name that is displayed in the basic information display section 0421. Further, the data display engine 0141 acquires the capacity information about the file systems and the LU configuration size of each LU, which is displayed in the basic information display section 0421, adds the acquired values together for all the computers and storage subsystems, displays the resulting total capacity 0553, and displays the amount of use 0554 by each computer and storage subsystem. The method for calculating individual column values will be described later.

Next, cases where a storage subsystem or LU is selected from the resource display frame 0410 will be described. The data display engine 0141 causes the detailed information display section 0422 to display a computer that uses the storage subsystem or LU. The data display engine 0141 displays the computer, which is displayed in the basic information display section 0421, in the column for "Name" 0551. Further, the data display engine 0141 acquires the capacity information about the file systems displayed in the basic information display section 0421, adds acquired capacity information together for each computer, and displays the resulting total capacity 0553 and the amount of use 0554.

The data display engine 0141 displays the detailed information display section 0422 in the sequence described below. The sequence described below commonly applies no matter whether a computer or file system is selected from the resource display frame 0410 or a storage subsystem or LU is selected from the resource display frame 0410.

For all the file systems displayed in the basic information display section 0421, the data display engine 0141 first uses a file system name 0312 as a search key to search the computer configuration table 0151 and retrieve the information about the total capacity 0313 and the amount of use 0314. Next, for the LUs displayed in the basic information display section 0421, the data display engine 0141 uses a storage subsystem 0321 and LU 0322 as search keys to search the storage information table 0152 and retrieve the capacity 0323. Further, the data display engine 0141 calculates the approximate amount of use of each LU. More specifically, the data display engine 0141 first acquires a list of file systems that use the LUs, then acquires the capacity and amount-of-use information about all the file systems within the list, and calculates the total capacity and the total amount of use. Finally, the above total capacity is divided by the total amount of use and then the resulting value is multiplied by the LU configuration size value to determine the approximate amount of LU use.

In general, the amount of individual volume use can be measured on the computer side only. Therefore, the embodiment calculates the approximate amount of individual LU use in accordance with the usage rate of each file system. A list of file systems that use the LUs is to be acquired by following the arrows 0510, which are displayed in the basic information display section 0421, in a reverse direction. The capacity and amount-of-use information about each file system is to be acquired by using a file system name 0312 as a search key to search the computer configuration table 0151 and retrieving the values representing the total capacity 0313 and the amount of use 0314.

If a computer or file system is selected from the resource display frame 0410, the associated values are added up for each computer or storage subsystem and displayed in the appropriate columns of the information display table 0550. If a storage subsystem or LU is selected from the resource display frame 0410, on the other hand, the associated values are added up for each computer and displayed in the appropriate columns of the information display table 0550.

If a tape library exists in the basic information display section 0421, the tape library name appears in the column for "Name" 0551. Further, the total LU capacity value of the tape library's copy source LUs appears in the column for "Total capacity" 0553, and the approximate amount of copy source LU use appears in the column for "Amount of use" 0554. The copy source LUs are to be acquired by using a tape library name 0341 as a search key to search the tape library information table 0154 and retrieving a copy source storage subsystem 0342 and a copy source LU 0343. The LU capacity of each LU is to be determined by using a storage subsystem 0321 and LU 0322 as search keys to search the storage information table 0152, retrieving the capacity 0323, the RAID configuration disk count 0325, and the parity disk count 0326, dividing the capacity 0323 by the RAID configuration disk count 0325, and multiplying the result of the above calculation by a value that is obtained by subtracting the parity disk count 0326 from the RAID configuration disk count 0325.

The method that the data display engine 0141 uses to display the action display section 0423 will now be described. The data display engine 0141 displays a detail display button 0571 and a file system expansion button 0572 in the action display section 0423. However, the file system expansion button appears only when a file system is selected from the resource display frame 0410. The operations performed at the click of the buttons will be described below.

The operation performed when the user clicks the detail display button 0571 will now be described. The data display engine 0141 opens the subwindow 0430, which is shown in FIG. 5. The subwindow 0430 comprises a subwindow graph display section 0610 and a subwindow table display section 0620. The subwindow graph display section 0610 displays a graph to promote understanding of the contents of the subwindow table display section 0620.

Figure 8:
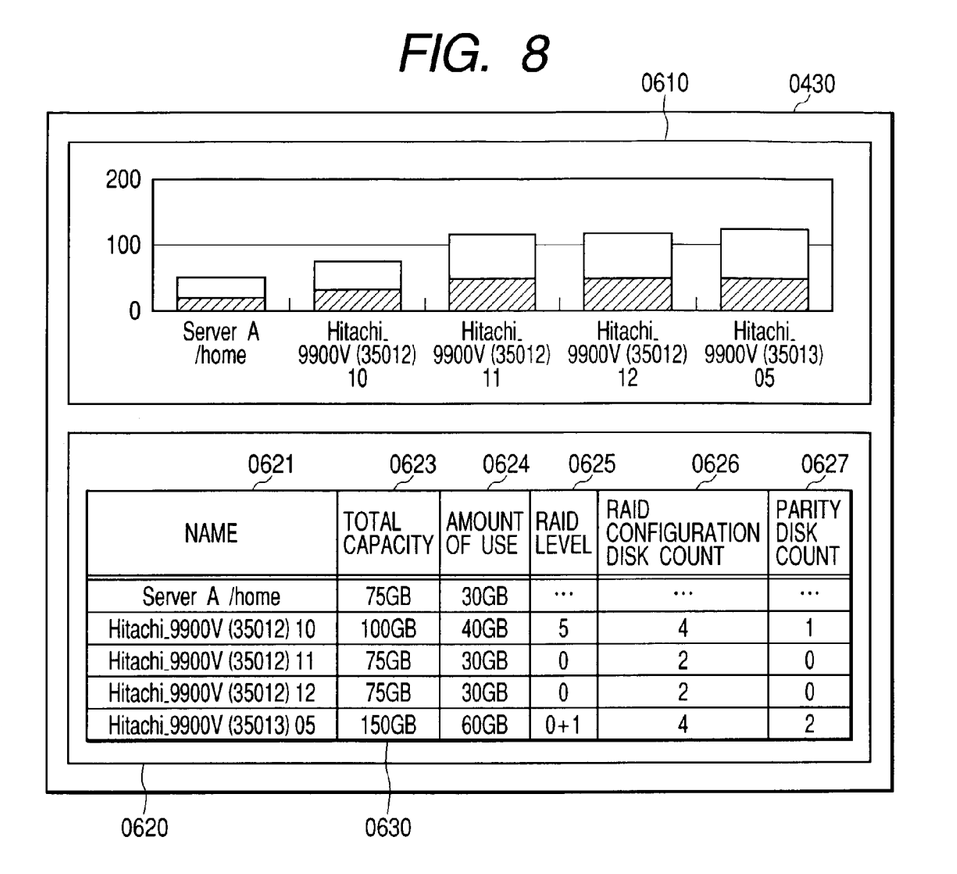
FIG. 8 shows an example of the contents of a subwindow according to the embodiment of the present invention.

FIG. 8 shows an example of the contents of the subwindow that is opened at the click of the detail display button 0571. In this case, a resource detail display table 0630 appears in the subwindow table display section 0620. The resource detail display table 0630 has a column that is designated "Name" 0621, which indicates the name of a file system or LU displayed in the basic information display section 0421. The table also has a column designated "Total capacity" 0623, which indicates the capacity of the above file system or the LU configuration size of the above LU. Further, the table's another column, which is designated "Amount of use" 0624, indicates the approximate amount of use of the above file system or LU. The remaining columns of the table, which are designated "RAID level" 0625, "RAID configuration disk count" 0626, and "Parity disk count" 0627, indicate a RAID level, RAID configuration disk count, and parity disk count, respectively.

The sequence for calculating the individual column values of the resource detail display table 0630 will now be described. For each file system displayed in the basic information display section 0421, a file system name 0312 is used as a search key to search the computer configuration table 0151 and retrieve the total capacity 0313 and the amount of use 0314. Then, for each LU displayed in the basic information display section 0421, a storage subsystem 0321 and LU 0322 are used as search keys to search the storage information table 0152 and retrieve the capacity 0323, RAID level 0324, RAID configuration disk count 0325, and parity disk count 0326.

Next, the approximate amount of use of each LU is calculated. More specifically, a list of file systems that use the LUs is acquired at first. Next, the capacity and amount-of-use information about each file system in the above file system list is acquired to calculate the total capacity and total amount of use. Subsequently, the approximate amount of LU use is calculated by dividing the above total capacity by the total amount of use and multiplying the resulting value by the LU's LU configuration size value.

If a tape library exists in the basic information display section 0421, the tape library name appears in the column for "Name" 0621. Further, the total LU capacity value of the tape library's copy source LUs appears in the column for "Total capacity" 0623, and the approximate amount of copy source LU use appears in the column for "Amount of use" 0624. When a computer or file system is selected from the resource display frame 0410 while the configuration described above is employed, it is possible to display a list of LUs actually used by the computer or file system as well as the information about their capacities.

Even if an available computer has a program for copying an LU in a storage subsystem to another LU in the same storage subsystem or an LU in another storage subsystem or a program for copying an LU in a storage subsystem to a tape library, the information collection engine 0121 acquires copy configurations from the above program. It is therefore possible to display a list of LUs actually used by a specified computer or file system and the information about their capacities in accordance with the above configurations.

As such being the case, the storage administrator or user can determine the amount of actual storage use by each computer or file system without having to launch a plurality of tools and manually associate the output results of the individual tools with each other.

Further, when a storage subsystem or LU is selected from the resource display frame 0410, it is possible to display a list of computers and file systems that use the storage subsystem or LU and present the information about their capacities. Thanks to this capability, the storage administrator or user can determine not only the computers and file systems that use a specific storage subsystem or LU, but also the ratio of storage subsystem use by the individual computers, without having to launch a plurality of tools and manually associate the output results of the tools with each other.

Figure 9:
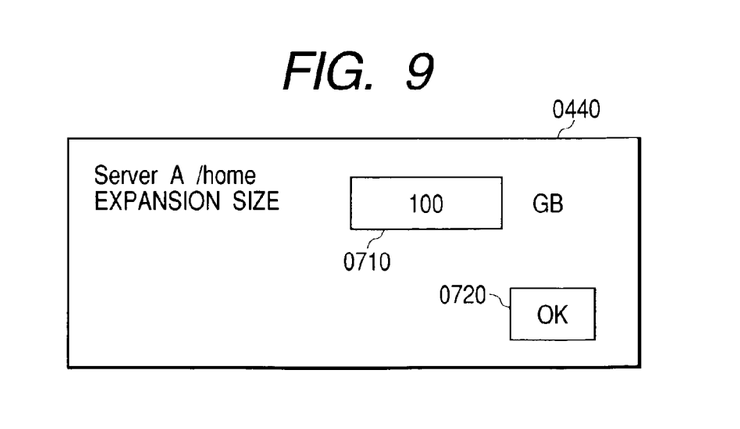
FIG. 9 shows an example of the contents of an input window according to the embodiment of the present invention.

The operation performed when the storage administrator or user clicks the file system expansion button 0572 will now be described. First of all, the data display engine 0141 opens the input window 0440, which is shown in FIG. 9. The input window 0440 includes an input box 0710 and an OK button 0720. The input box 0710 is an input area, which allows the user to enter a numerical value. The OK button 0720 is used to open the subwindow 0430.

Figure 10:
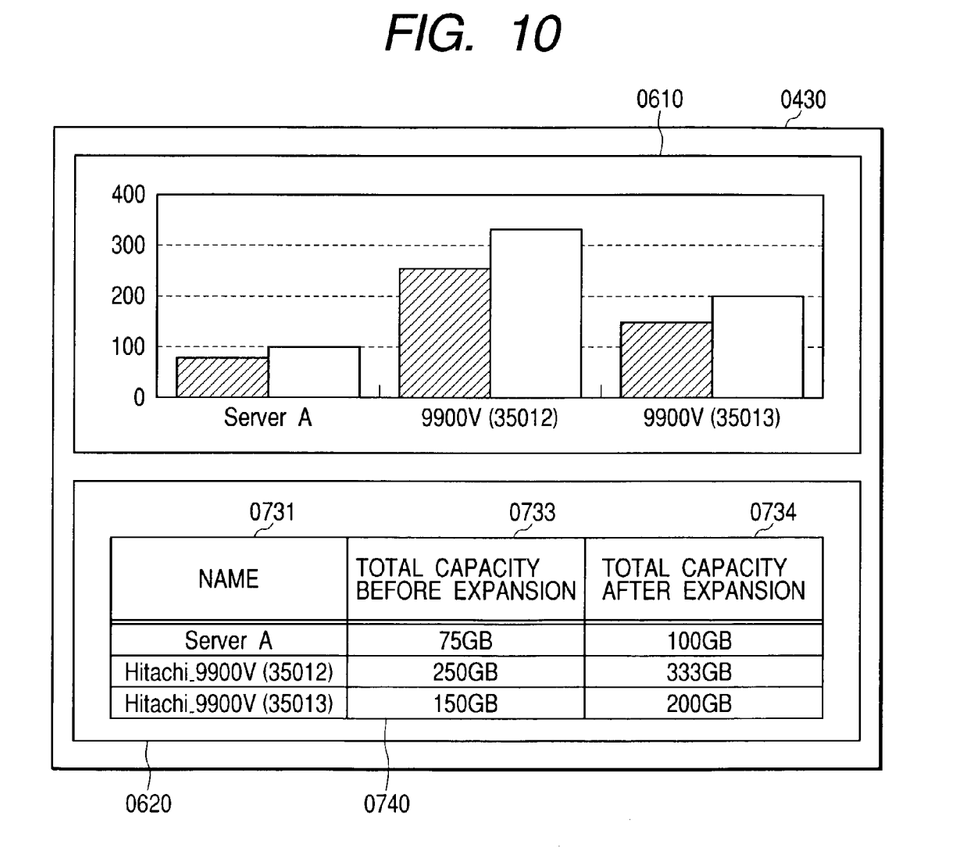
FIG. 10 shows an example of the contents of a subwindow according to the embodiment of the present invention.

When the storage administrator or user enters in the input box 0710 a projected capacity expansion value for a file system selected from the resource display frame 0410 and then press the OK button 0720, the data display engine 0141 displays the subwindow 0430 shown in FIG. 10 in accordance with the entered value. The subwindow 0430 shown in FIG. 10 comprises the subwindow graph display section 0610 and subwindow table display section 0620. In the embodiment, an expansion information display table 0740 appears in the subwindow table display section 0620.

The data display engine 0141 displays a computer name, storage subsystem name, or tape library name in the column for "Name" 0731 within the expansion information display table 0740. The data display engine 0141 also displays the current capacity of a computer or storage subsystem in the column for "Total capacity before expansion" 0733 and the capacity prevailing after a file system expansion according to the value entered via the input box 0710 in the column for "Total capacity after expansion" 0734.

The numerical values to be output in the columns are calculated in a sequence described below. The name 0551 displayed by the information display table 0550 within the detailed information display section 0422 shown in FIG. 6 appears in the column for "Name" 0731. The total capacity 0553 appears in the column for "Total capacity before expansion" 0733. Subsequently, the expansion ratio is calculated according to the file system's current capacity and the capacity prevailing after expansion, and the total capacity before expansion 0733 for each record is multiplied by the expansion ratio to display the resulting value in the column for "Total capacity after expansion" 0734. When the above configuration is employed, the disk capacity required for each storage subsystem can be displayed in accordance with the file system capacity expansion value entered by the user.

In the embodiment described above, the storage administrator or user enters a file system capacity expansion value. However, the data display engine 0141 can alternatively predict the file system size required in the future and handle the predicted size value as the above-mentioned input value to display the disk capacity that is required in the future. For example, the change in the amount of each file system use can be monitored to determine the increase/decrease during a particular period and use it for file system expansion size prediction. Although the required disk capacity is indicated in the embodiment described above, the storage administrator or user can alternatively predefine a disk unit price table to display the price of required disk purchase.

More specifically, a unit price table can be defined to indicate the capacity and price of possible disk expansion for each storage subsystem and let the data display engine 0141 search the unit price table to determine the number of disks and other disk requirements for providing the disk capacity necessary for file system expansion and display the price of required disk purchase. When this alternative is used, the storage administrator or user can determine the file system capacity required in the future and the price of required disk purchase without having to launch a plurality of tools and manually associate the output results of the individual tools with each other.

As described above, the present invention provides each computer with a function for acquiring the capacity information and copy configurations from computers and storage subsystems and provides a special computer with a function for collecting various items of information acquired by each computer, associating them with each other, and displaying them. As a result, the present invention makes it possible to determine the amount of actual storage use by a specified computer or file system.

What is claimed is:

1. A method for displaying the amount of storage use in a computer system in which servers comprising a plurality of file systems and storage subsystems each including a plurality of volumes and a mechanism configured to copy an internal volume to a specific volume are connected via a network, the method comprising the steps of:

acquiring, by said servers, a list of said file systems composing said servers, the capacity and amount-of-use information about said file systems, and names of said plurality of volumes which are connected to said list of file systems;

acquiring from said storage subsystem, by said servers, a list of volumes composing said storage subsystems, the information about the capacity of each volume of said list of volumes composing said storage subsystems, a configuration of each of intra-volume copy operations performed within said storage subsystems, and a configuration relating to copy operations performed between said storage subsystems;

collecting, by a special server, which is one of said servers, said information collected by the other servers; and defining, by said special server, association among various items of information collected according to said copy operation and displaying, by said special server, a list of said storage subsystems used by a specified server or file system, the total volume capacity, and the amount of volume use on a display device of said special server or other server;

wherein said special server predicts a future capacity of said specified file system in accordance with an increase/decrease during a specific period, and displays a disk capacity that is required for each of said storage subsystems within the current configuration when the capacity of said file system is to be changed to said predicted capacity.

2. A method for displaying the amount of storage use in a computer system in which a storage subsystem comprising a plurality of volumes, first servers including a plurality of file systems, and a second server comprising a plurality of file systems and a program for copying a volume in said storage subsystem to a volume in said storage subsystem or a different storage subsystem are connected via a network, the method comprising the steps of:

acquiring, by said first and second servers, a list of said file systems composing the respective server, the capacity and amount-of-use information about said file systems, and the names of said plurality of volumes which are connected to said list of file systems;

acquiring, by said first and second servers, a list of volumes composing said storage subsystem and the capacity of each volume of said list of volumes composing said storage system, from said storage subsystem;

collecting, by a special server, which is one of said first servers, information acquired by the other first servers and said second server;

acquiring, by said special server, said copy operation from said second server; and defining, by said special server, the association among various items of information collected according to said copy operation and displaying, by said special server, a list of said storage subsystems used by a specified server or file system, the total volume capacity, and the amount of volume use on a display device of said special server or other server;

wherein said special server predicts a future capacity of said specified file system in accordance with an increase/decrease during a specific period, and displays a disk capacity that is required for each of said storage subsystems within the current configuration when the capacity of said file system is to be changed to said predicted capacity.

3. A method for displaying the amount of storage device use in a computer system in which computers each comprising a plurality of file systems and storage controllers having a storage device, which includes a plurality of volumes, are connected via a network, the method comprising the steps of:

acquiring, by said computers, a list of file systems composing said computers, capacity and amount-of-use information about said file systems, and the names of volumes of said storage controllers connected to said list of file systems;

acquiring, by said storage controllers, a list of volumes, information about the capacity of each volume of said list of volumes, configurations relating to copy operations performed between said list of volumes within the storage controllers, and configurations relating to copy operations performed between said storage controllers;

collecting, by a special computer, which is one of said computers, said information collected by the other computers; and defining, by said special computer, association among various items of information collected according to said copy operation and displaying, by said special computer, a list of said storage subsystems used by a specified computer or file system, the total volume capacity, and the amount of volume use on a display device of said special computer or other computer;

wherein said special server predicts a future capacity of said specified file system in accordance with an increase/decrease during a specific period, and displays a disk capacity that is required for each of said storage subsystems within the current configuration when the capacity of said file system is to be changed to said predicted capacity.

* * * * *